(12) United States Patent
Takenaka et al.

(10) Patent No.: US 7,798,511 B2
(45) Date of Patent: Sep. 21, 2010

(54) STEERING SYSTEM FOR MOTORCYCLE AND MOTORCYCLE

(75) Inventors: Hiroshi Takenaka, Wako (JP); Akira Kato, Wako (JP); Haruki Nishimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/507,070

(22) Filed: Jul. 22, 2009

(65) Prior Publication Data
US 2010/0025140 A1 Feb. 4, 2010

(30) Foreign Application Priority Data
Jul. 31, 2008 (JP) .............................. 2008-198850

(51) Int. Cl.
*B62K 21/04* (2006.01)
(52) U.S. Cl. ...................... 280/280; 280/279; 74/551.1
(58) Field of Classification Search ................. 280/279, 280/280, 276, 274; 74/551.1, 551.2
See application file for complete search history.

(56) References Cited

U.S. PATENT DOCUMENTS

| 4,032,168 | A | * | 6/1977 | Emerson | 280/279 |
|---|---|---|---|---|---|
| 6,332,625 | B1 | * | 12/2001 | Fukunaga et al. | 280/280 |
| 6,748,821 | B1 | * | 6/2004 | Smith | 74/551.3 |
| 7,018,126 | B2 | * | 3/2006 | Henricksen | 403/286 |
| 7,258,356 | B2 | * | 8/2007 | Okazaki et al. | 280/272 |
| 7,621,566 | B2 | * | 11/2009 | Fujita et al. | 285/125.1 |
| 7,699,331 | B2 | * | 4/2010 | McVickar | 280/279 |
| D615,002 | S | * | 5/2010 | Norman | D12/118 |
| 2004/0140644 | A1 | * | 7/2004 | Kofuji et al. | 280/276 |
| 2005/0051993 | A1 | * | 3/2005 | Ito et al. | 280/276 |
| 2006/0279059 | A1 | * | 12/2006 | Czysz | 280/276 |
| 2008/0203699 | A1 | * | 8/2008 | Truchinski | 280/276 |
| 2008/0246247 | A1 | * | 10/2008 | Hoshi | 280/280 |

FOREIGN PATENT DOCUMENTS

JP 2987221 B2 9/1992

* cited by examiner

*Primary Examiner*—Kevin Hurley
*Assistant Examiner*—Tashiana Adams
(74) *Attorney, Agent, or Firm*—Ditthavong Mori & Steiner, P.C.

(57) ABSTRACT

A steering system for a motorcycle includes a head pipe, a steering stem, a top bridge, a bottom bridge, a front fork, and a steering handlebar. The steering stem is supported by the head pipe. The top bridge has a center portion, a side portion extending from the center portion, and a holding portion provided at the side portion. The top bridge is supported by the steering stem at the center portion to steerably move around the head pipe. The bottom bridge is supported by the steering stem to steerably move around the head pipe. The front fork is held by the top bridge through the holding porting and is held by the bottom bridge. The top bridge has a protruding portion provided on an upper face of the top bridge and extending from the holding portion toward the center portion of the top bridge.

5 Claims, 7 Drawing Sheets

STEERING SYSTEM FOR MOTORCYCLE AND MOTORCYCLE

CROSS-REFERENCE TO RELATED APPLICATIONS

The present application claims priority under 35 U.S.C. §119 to Japanese Patent Application No. 2008-198850, filed Jul. 31, 2008. The contents of this application are incorporated herein by reference in their entirety.

BACKGROUND OF THE INVENTION

1. Field of the Invention

The present invention relates to a steering system for a motorcycle and a motorcycle including the steering system.

2. Discussion of the Background

As a related art steering system for a motorcycle, there has been known the steering system in which the upper portions of front forks for rotatably supporting a front wheel are held by a top bridge, the top bridge is attached to a head pipe, and a steering handlebar is attached to the top bridge, thereby freely steering the front forks (for example, see JP Patent No. 2987221).

Now, typically in motorcycles, a top bridge holds a front fork at both ends thereof, and is supported by a head pipe at an intermediate portion thereof. Thus, when a front wheel runs over obstacles and the front forks are compressed, the top bridge is subjected to an upward bending moment around the head pipe, and in particular, stress is concentrated on root portions of holding portions for holding the front forks. Also, in the same manner as the front forks, a steering handlebar is attached to both ends of the top bridge. Therefore, when the steering handlebars are steered, the top bridge is subjected to a bending moment in a steering direction around the head pipe, and stress also tends to be concentrated on the root portions of the holding portions for holding the front forks.

Here, like the steering system for the motorcycle disclosed in JP Patent No. 2987221 as described above, when a top bridge is shaped like a simple plate, it is common practice to increase the thickness of the entire top bridge in order to ensure the rigidity of the top bridge against the above-described bending moment, or the like. In this case, it has been a problem that there is a limit to the reduction in weight of the top bridge.

SUMMARY OF THE INVENTION

According to one aspect of the present invention, a steering system for a motorcycle includes a head pipe, a steering stem, a top bridge, a bottom bridge, a front fork, and a steering handlebar. The head pipe is provided at a front end portion of a body frame. The steering stem is supported by the head pipe. The top bridge has a center portion, a side portion extending from the center portion, and a holding portion provided at the side portion. The top bridge is supported by the steering stem at the center portion to steerably move around the head pipe. The bottom bridge is supported by the steering stem to steerably move around the head pipe. The front fork is held by the top bridge through the holding porting and is held by the bottom bridge. The front fork rotatably supports a front wheel. The steering handlebar is provided at the side portion of the top bridge to move together with the top bridge. The top bridge has a protruding portion provided on an upper face of the top bridge and extending from the holding portion toward the center portion of the top bridge.

According to another aspect of the present invention, a motorcycle includes a body frame, and a steering system. The steering system includes a head pipe, a steering stem, a top bridge, a bottom bridge, a front fork, and a steering handlebar. The head pipe is provided at a front end portion of the body frame. The steering stem is supported by the head pipe. The top bridge has a center portion, a side portion extending from the center portion, and a holding portion provided at the side portion. The top bridge is supported by the steering stem at the center portion to steerably move around the head pipe. The bottom bridge is supported by the steering stem to steerably move around the head pipe. The front fork is held by the top bridge through the holding porting and is held by the bottom bridge. The front fork rotatably supports a front wheel. The steering handlebar is provided at the side portion of the top bridge to move together with the top bridge. The top bridge has a protruding portion provided on an upper face of the top bridge and extending from the holding portion toward the center portion of the top bridge.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
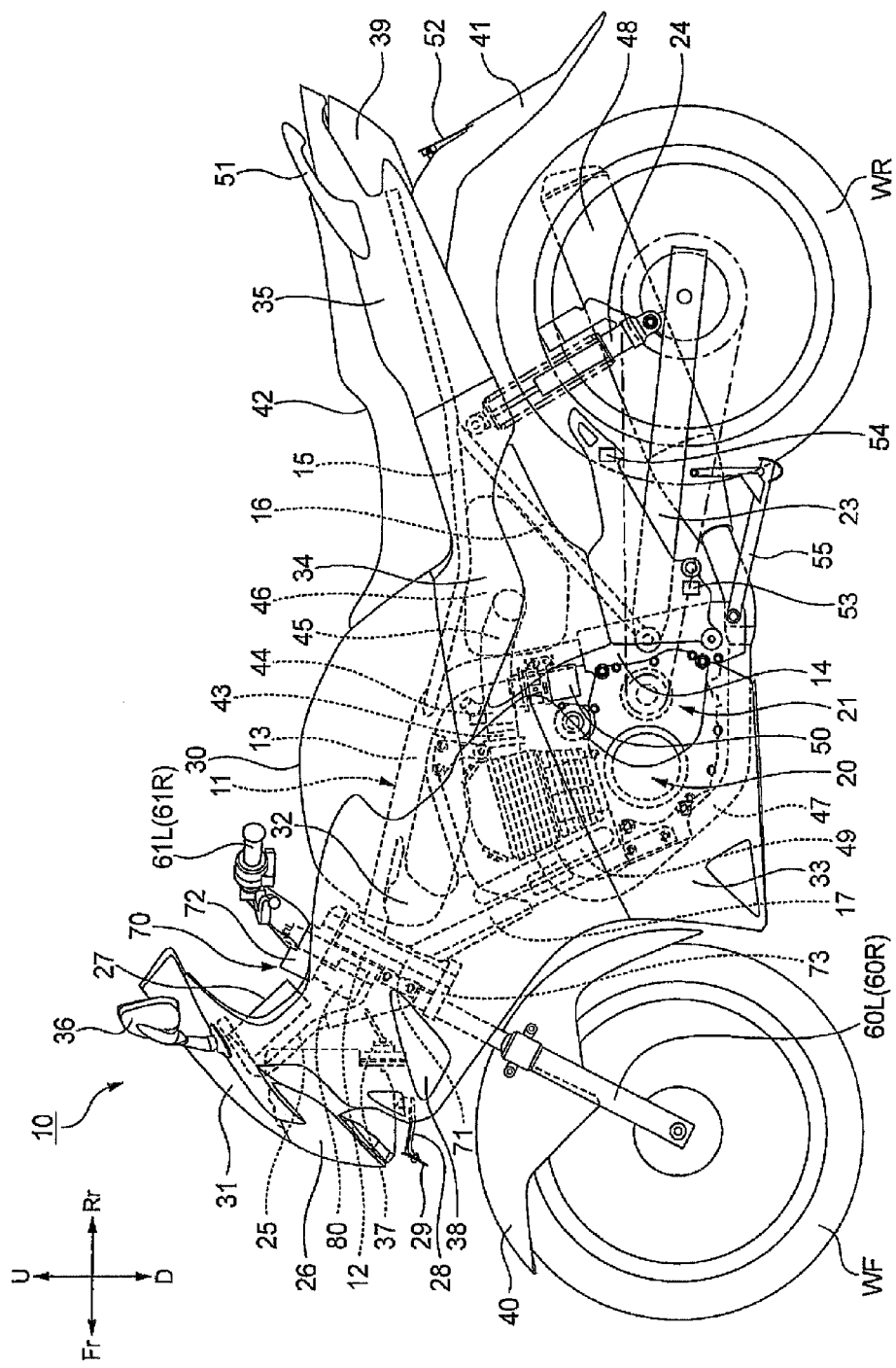
FIG. 1 is a left side view for explaining a motorcycle on which a steering system for the motorcycle according to an embodiment of the present invention is mounted.

The embodiments will now be described with reference to the accompanying drawings, wherein like reference numerals designate corresponding or identical elements throughout the various drawings.

An embodiment of a steering system for a motorcycle according to an embodiment of the present invention will hereinafter be explained in detail with reference to the accompanying drawings. It is to be noted that the drawings should be viewed based on the directions of reference numerals. In the following descriptions, the terms "front", "rear", "left", "right", "up" and "down" refer to the directions viewed from the rider's position. In the drawings, "Fr" represents a front of a vehicle, "Rr" rear, "L" left, "R" right, "U" upward direction, and "D" downward direction.

As shown in FIG. 1, a motorcycle 10 according to this embodiment includes a body frame 11 composed of a head pipe 12 provided at a front end of the body frame 11, a main frame 13 extending rearward and downward from the head pipe 12, a pivot plate 14 joined to a rear end portion of the main frame 13, a pair of left and right seat frames 15 joined to an intermediate portion of the main frame 13 and extending rearward and upward, a pair of left and right sub-frames 16 joined to the pivot plate 14 and extending rearward and upward, with rear end portions joined to rear end portions of the seat frames 15, and a down tube 17 extending rearward and downward from the head pipe 12. On the main frame 13, the pivot plate 14, and the down tube 17, an engine 20 and a transmission 21 provided integrally with a rear portion of the engine 20 are mounted.

Also, the motorcycle 10 includes a swing arm 23 swingably supported by the pivot plate 14, a rear wheel WR rotatably supported at a rear end portion of the swing arm 23, a cushion unit 24 joined to the swing arm 23 and the seat frames 15 side, a headlight 26 and a meter 27 attached to the head pipe 12 through a front stay 25, a front license plate 29 attached to the headlight 26 through a license plate stay 28, and a fuel tank 30 fixed on the main frame 13.

Here, in FIG. 1, a reference numeral 31 denotes a window screen; 32, a front cowl; 33, an under cowl; 34, a side cowl; 35, a rear cowl; 36, a rearview mirror; 37, a horn; 38, a front turn signal; 39, a taillight device; 40, a front fender; 41, a rear fender; 42, a seat; 43, an inlet pipe; 44, a throttle body; 45, a connecting pipe; 46, an air cleaner; 47, an exhaust pipe; 48, a muffler; 49, an oil cooler; 50, a fuel pump; 51, a grab rail; 52, a rear license plate; 53, a main step; 54, a pillion step; 55, and a main stand.

Figure 2:
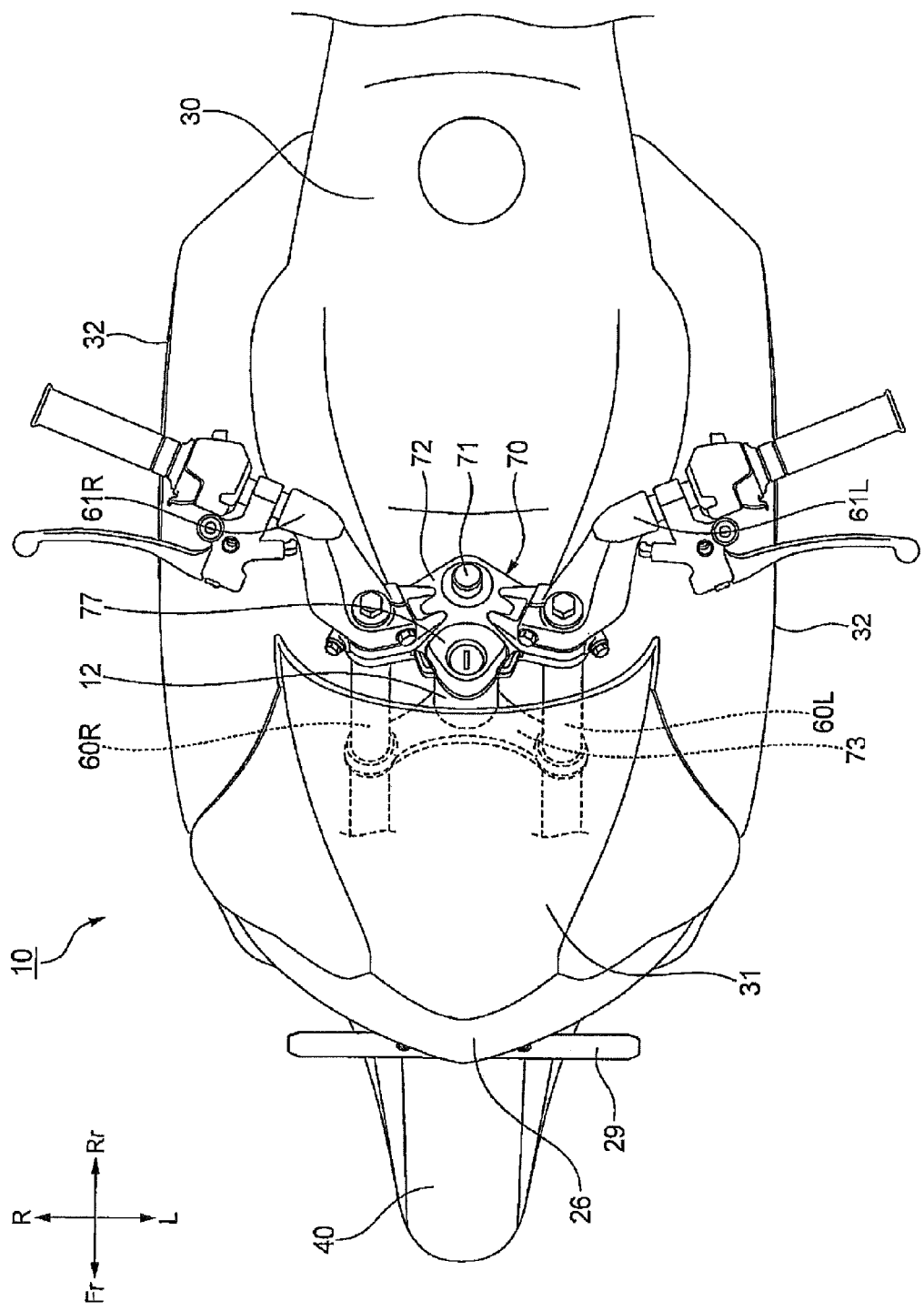
FIG. 2 is an enlarged plan view of a front portion of the motorcycle shown in FIG. 1.

The motorcycle 10 also includes, as shown in FIGS. 1 and 2, a pair of left and right front forks 60L and 60R steerably supported through a steering system 70 by the head pipe 12 of the body frame 11, a front wheel WF rotatably supported between lower end portions of the pair of left and right front forks 60L and 60R, and left and right separate steering handlebars 61L and 61R respectively attached to upper end portions of the pair of left and right front forks 60L and 60R.

Furthermore, as shown in FIGS. 3 to 7, at the lower end portions of the steering handlebars 61L and 61R, fixed portions 62 fixed to the front forks 60L and 60R are formed. By fastening the fixed portions 62 with bolts 91, the steering handlebars 61L and 61R are fixed to the upper end portions of the front forks 60L and 60R.

The steering system 70 includes, as shown in FIGS. 2 to 7, a steering stem 71 inserted through the head pipe 12, a top bridge 72 with an intermediate portion fixed to an upper end portion of the steering stem 71, and a bottom bridge 73 with an intermediate portion fixed to a lower end portion of the steering stem 71. Thus, the top bridge 72 and the bottom bridge 73 are steerably attached to the head pipe 12 through the steering stem 71.

Also, as shown in FIGS. 3 to 7, at both ends of the top bridge 72, holding portions 74 and 74 for respectively holding the pair of left and right front forks 60L and 60R are formed. By fastening the holding portions 74 with bolts 92, the front forks 60L and 60R are held at both ends of the top bridge 72. Also, at front portions of the holding portions 74 and 74, respective stepped portions 74a are formed, and are in contact with the fixed portions 62 provided at the lower end portions of the steering handlebars 61L and 61R, thereby locking the steering handlebars 61L and 61R from turning.

Figure 3:
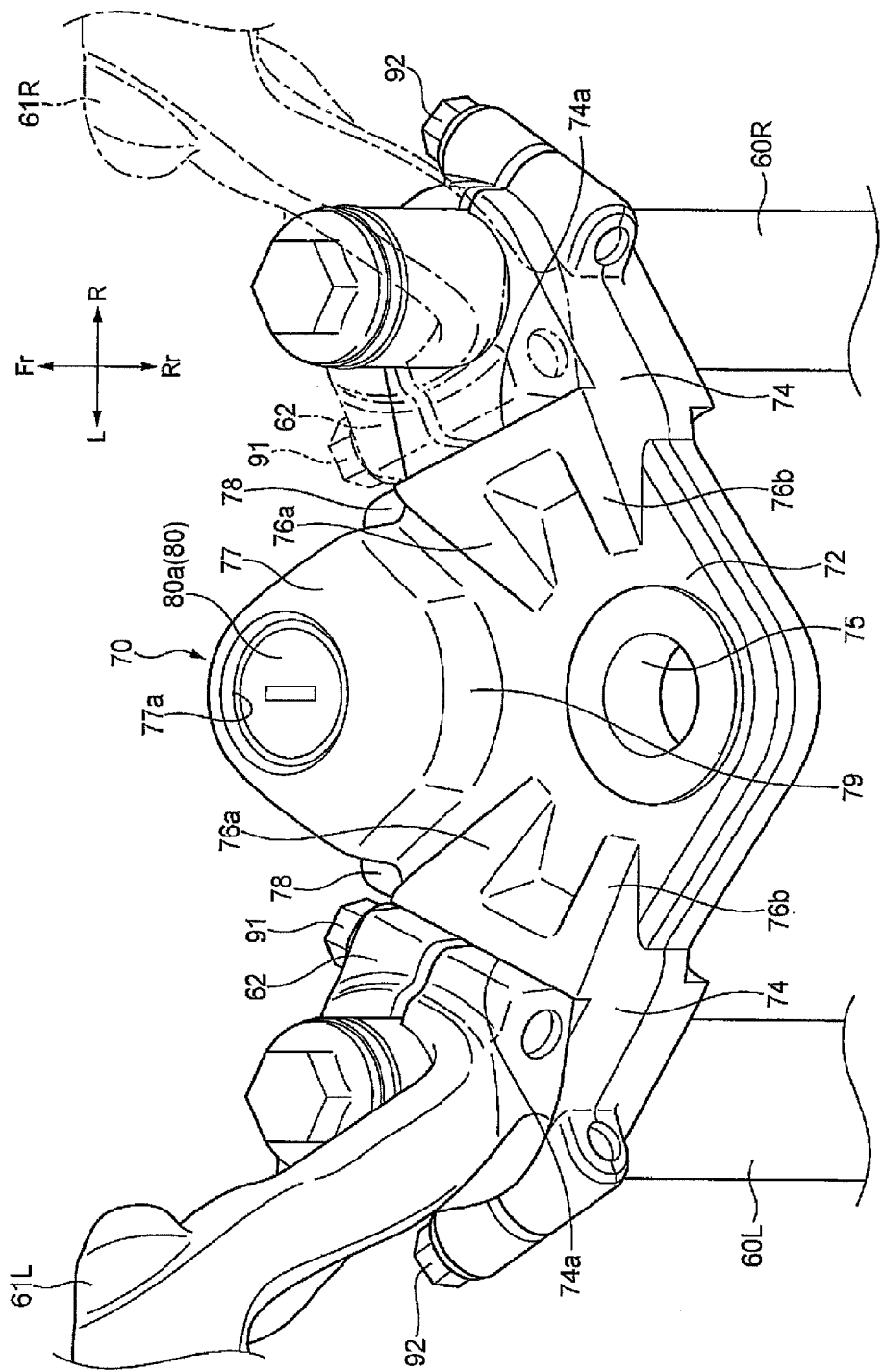
FIG. 3 is a perspective view of the periphery of a top bridge shown in FIG. 1 as seen from the rear and above.
Figure 4:
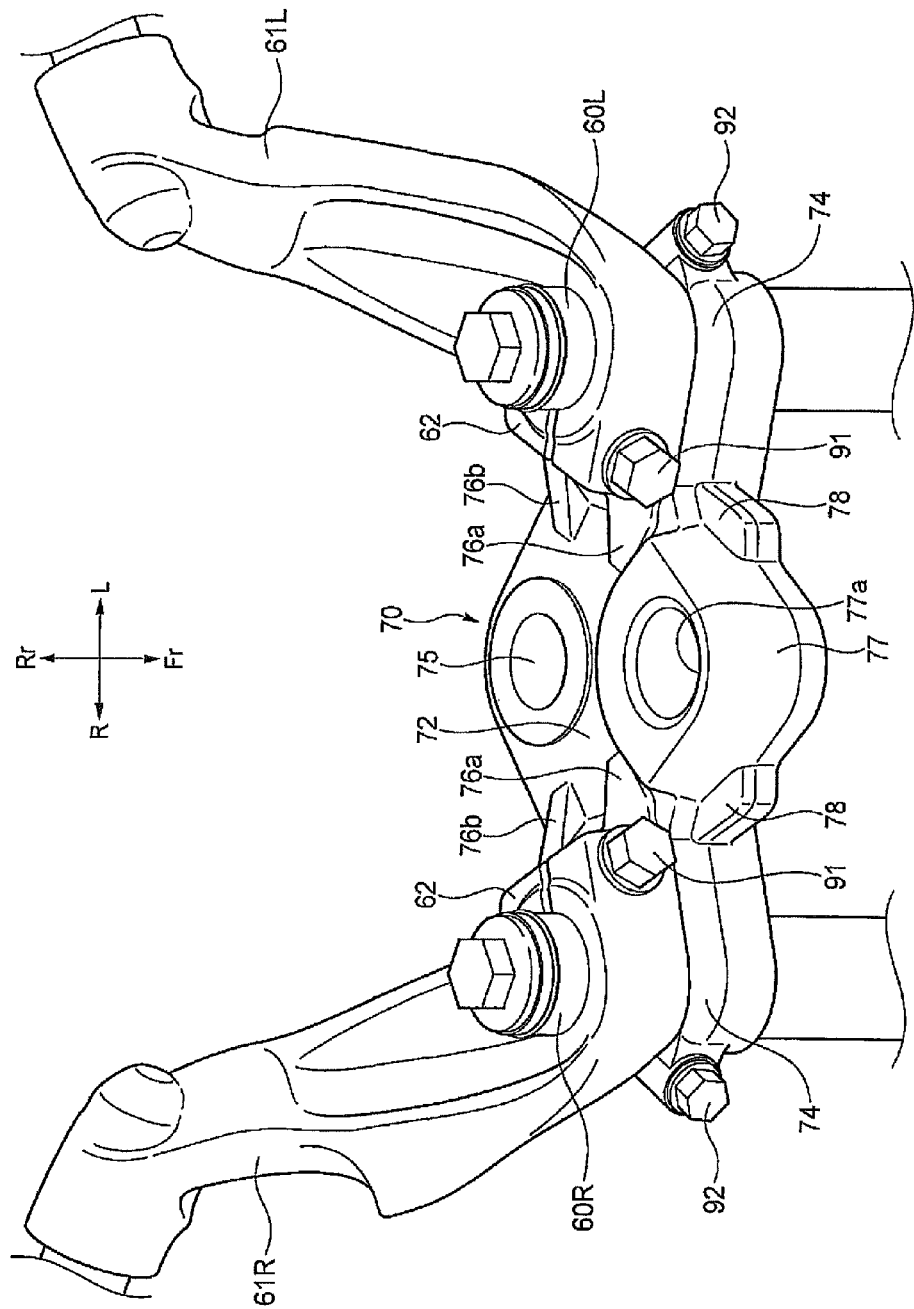
FIG. 4 is a perspective view of the periphery of the top bridge shown in FIG. 1 as seen from the front and above.
Figure 5:
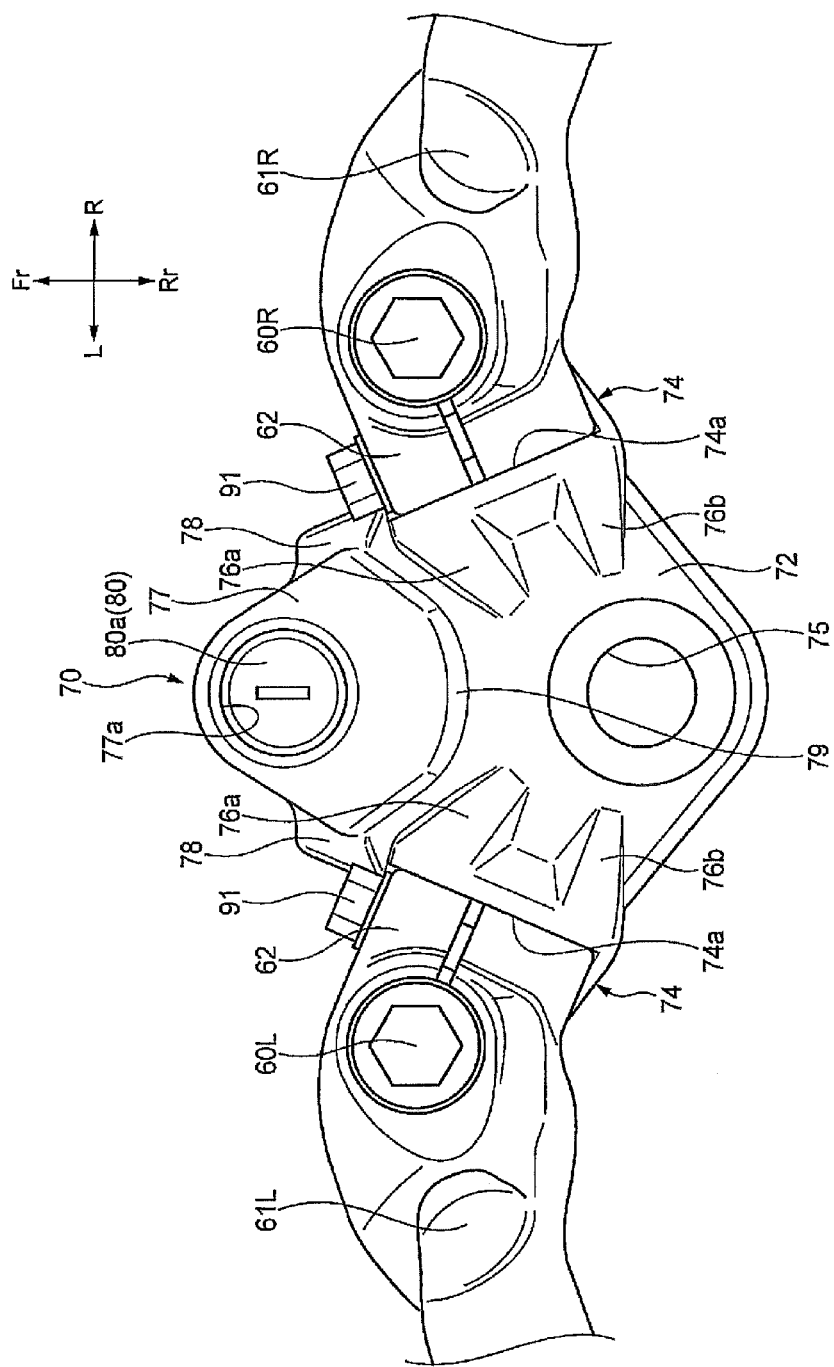
FIG. 5 is a plan view of the periphery of the top bridge shown in FIG. 1 as seen from above.
Figure 6:
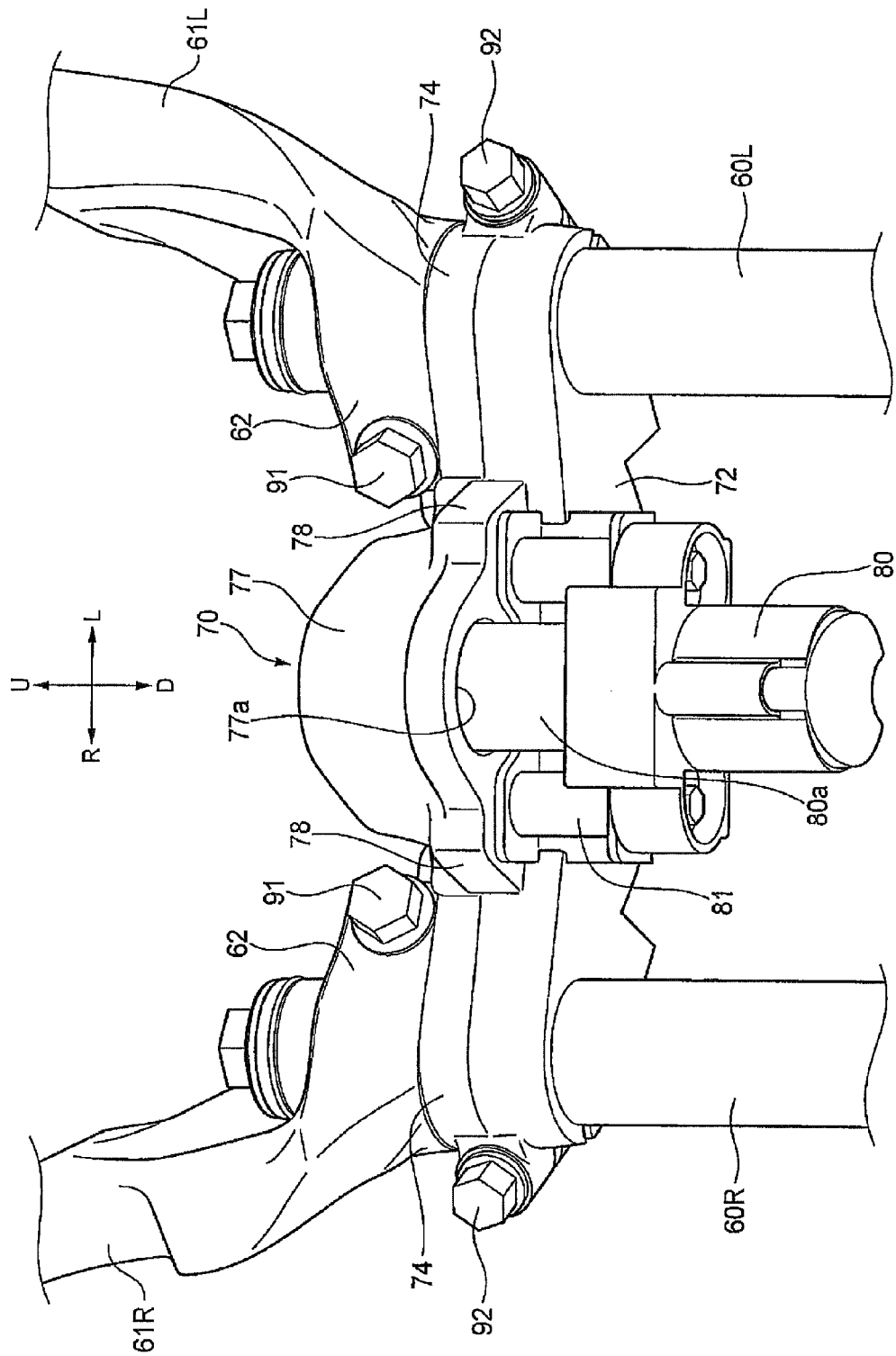
FIG. 6 is a perspective view of the periphery of the top bridge shown in FIG. 1 as seen from the front and below.
Figure 7:
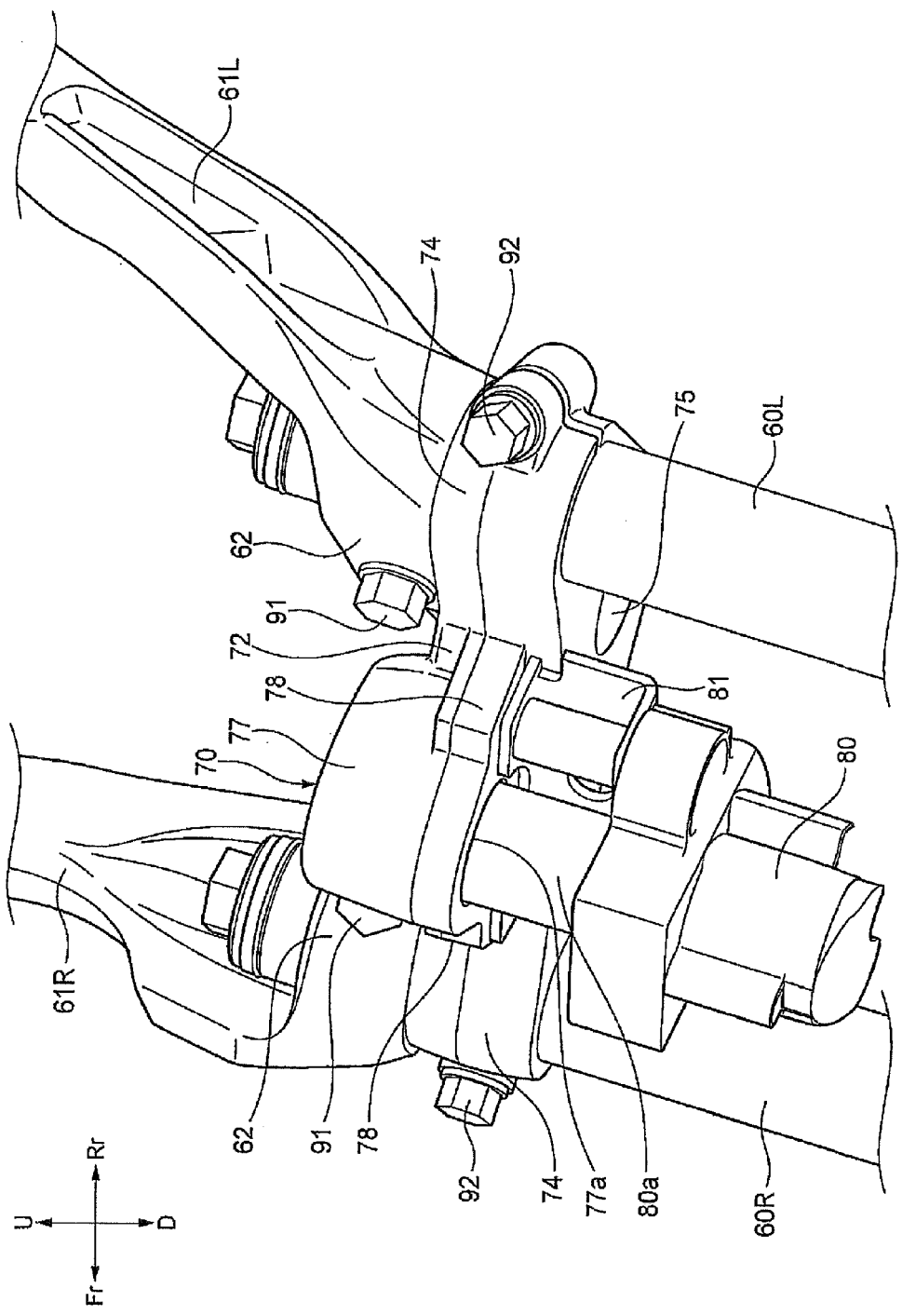
FIG. 7 is a perspective view of the periphery of the top bridge shown in FIG. 1 as seen from the left front.

Furthermore, according to this embodiment, as shown in FIGS. 3 to 5, on an upper face of the top bridge 72, first and second protruding portions 76a and 76b extending from the holding portions 74 toward the intermediate portion, that is, toward a stem through-hole 75 allowing the steering stem 71 to pass through, are integrally formed. Also, the first protruding portions 76a are formed so as to extend from the front portions of the holding portions 74 toward the stem through-hole 75, and the second protruding portions 76b are formed so as to extend from rear portions of the holding portions 74 toward the stem through-hole 75. In addition, the first and second protruding portions 76a and 76b are formed in a tapered shape gradually decreasing in height toward the stem through-hole 75.

Also, according to this embodiment, as shown in FIGS. 3 to 7, on a front portion of the top bridge 72, a cover portion 77 projecting forward therefrom for covering an upper portion of a main switch 80 is integrally formed. The main switch 80 is fixed to a lower portion (lower face) of the cover portion 77 through a spacer 81 with bolts not shown. Also, at an intermediate portion of the cover portion 77, a cylinder through-hole 77a allowing a key cylinder portion 80a of the main switch 80 to pass through, is formed along a vertical direction.

Furthermore, according to this embodiment, as shown in FIGS. 3 to 7, projecting portions 78 and 78 for joining together either side portion of the cover portion 77 and the front portion of the top bridge 72, are formed integrally with the top bridge 72.

Also, according to this embodiment, as shown in FIGS. 3 and 5, a joint between the front portion of the top bridge 72 and the cover portion 77 has a step formed by a sidewall portion 79 extending upward from the upper face of the top bridge 72, thereby enhancing the rigidity of the top bridge 72 and improving the operability of the main switch 80.

As described above, according to the steering system 70 for the motorcycle 10 of this embodiment, the top bridge 72 has the first and second protruding portions 76a and 76b provided on the upper face of the top bridge 72 and extending from the respective holding portions 74 toward the intermediate portion (the stem through-hole 75), thereby reducing the weight of the top bridge 72 and ensuring the rigidity of the top bridge 72. In particular, since the first and second protruding portions 76a and 76b are provided on the upper face of the top bridge 72, it is possible to more effectively enhance the rigidity of the top bridge 72 against an upward bending moment around the head pipe 12.

Also, according to the steering system 70 for the motorcycle 10 of this embodiment, the left and right separate steering handlebars 61L and 61R are fixed to the upper end portions of the front forks 60L and 60R, respectively, and the protruding portions provided on the upper face of the top bridge 72 include the first protruding portions 76a extending from the front portions of the holding portions 74 toward the intermediate portion (the stem through-hole 75), and the second protruding portions 76b extending from the rear portions of the holding portions 74 toward the intermediate portion (the stem through-hole 75). Thus, it is possible to effectively enhance the rigidity of the top bridge 72 against a bending moment in a steering direction around the head pipe 12. Also, since the first and second protruding portions 76a and 76b are provided at respective root portions of the front and rear portions of the holding portions 74, the rigidity of the top bridge 72 can be more effectively enhanced. Furthermore, by eliminating protruding portions from the intermediate portions between the front portions and the rear portions of the holding portions 74, reduction in weight of the top bridge 72 can be achieved.

Moreover, according to the steering system 70 for the motorcycle 10 of this embodiment, since the cover portion 77 projecting forward from the front portion of the top bridge 72 for covering the upper portion of the main switch 80 is provided integrally with the top bridge 72, it is possible to reduce the number of parts, as compared with the case in which a cover portion is separately provided. In addition, it is possible to prevent possible tampering with the cover portion, such as any attempt to remove the cover portion, in the case where the cover portion is separately provided.

Also, according to the steering system 70 for the motorcycle 10 of this embodiment, since the main switch 80 is fixed to the lower portion of the cover portion 77, and the projecting portions 78 and 78 for joining together the side portions of the cover portion 77 and the front portion of the top bridge 72, are provided integrally with the top bridge 72, it is possible to reinforce the joint between the cover portion 77 and the top bridge 72. Thus, the main switch 80, which is a heavy item, can be tightly fixed to the top bridge 72.

According to a first embodiment of the present invention, a steering system for a motorcycle includes: a head pipe provided at a front end portion of a body frame; a top bridge and a bottom bridge steerably supported by the head pipe through la steering stem; a front fork held by the top bridge and the bottom bridge for rotatably supporting a front wheel; and a steering handlebar provided at the side of the top bridge so as to move integrally with the top bridge, and in which the top bridge has a holding portion provided at each of both ends thereof for holding the front fork, the top bridge has a protruding portion provided on an upper face thereof and extending from the holding portion toward an intermediate portion.

According to a second embodiment of the present invention, in addition to the constitution of the first embodiment, the steering handlebars is separated into left and right, each of left and right steering handlebars is fixed to an upper end portion of the front fork, and the protruding portion has a first protruding portion extending from a front portion of the holding portion toward the intermediate portion, and a second protruding portion extending from a rear portion of the holding portion toward the intermediate portion.

According to a third embodiment of the present invention, in addition to the constitution of the second embodiment, a cover portion projecting forward from a front portion of the top bridge for covering an upper portion of a main switch is provided integrally with the top bridge.

According to a fourth embodiment of the present invention, in addition to the constitution of the third embodiment, the main switch is fixed to a lower portion of the cover portion, and a projecting portion for joining together a side portion of the cover portion and the front portion of the top bridge is provided integrally with the top bridge.

According to the first embodiment of the present invention, a top bridge has a protruding portion provided on an upper face thereof and extending from a holding portion toward an intermediate portion. Therefore, it is possible to achieve reduction in weight of the top bridge and ensure rigidity of the top bridge. In particular, since the protruding portion is provided on the upper face of the top bridge, it is possible to more effectively enhance the rigidity of the top bridge against an upward bending moment around the head pipe.

According to the second embodiment of the present invention, the steering handlebar is separated into left and right, and each of left and right steering handlebars is fixed to an upper end portion of the front fork. Also, protruding portion has a first protruding portion extending from a front portion of the holding portion toward the intermediate portion, and a second protruding portion extending from a rear portion of the holding portion toward the intermediate portion. Thus, it is possible to more effectively enhance the rigidity of the top bridge against a bending moment in a steering direction around the head pipe. Also, since the protruding portion is provided at each of root portions of the front and rear portions of each holding portion, the rigidity of the top bridge can be more effectively enhanced. Furthermore, by eliminating a protruding portion from an intermediate portion between the front and rear portions of the holding portion, the reduction in weight of the top bridge can be achieved.

According to the third embodiment of the present invention, a cover portion projecting forward from a front portion of the top bridge for covering an upper portion of a main switch is provided integrally with the top bridge. Therefore, the number of parts can be reduced, as compared with the case in which a cover portion is separately provided. In addition, it is possible to prevent possible tampering with the cover portion, such as any attempt to remove the cover portion, in the case where the cover portion is separately provided.

According to the fourth embodiment of the present invention, since the main switch is fixed to a lower portion of the cover portion, and a projecting portion for joining together a side portion of the cover portion and the front portion of the top bridge is provided integrally with the top bridge, it is possible to reinforce the joint between the cover portion and the top bridge. Thus, the main switch, which is a heavy item, can be tightly fixed to the top bridge.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A steering system for a motorcycle comprising:
    a head pipe provided at a front end portion of a body frame;
    a steering stem supported by the head pipe;
    a top bridge having a center portion, a side portion extending from the center portion, and a holding portion provided at the side portion, the top bridge being supported by the steering stem at the center portion to steerably move around the head pipe;
    a bottom bridge supported by the steering stem to steerably move around the head pipe;
    a front fork held by the top bridge through the holding porting and held by the bottom bridge, the front fork rotatably supporting a front wheel; and
    a steering handlebar provided at the side portion of the top bridge to move together with the top bridge,
    wherein the top bridge has a protruding portion provided on an upper face of the top bridge and extending from the holding portion toward the center portion of the top bridge.

2. The steering system for the motorcycle according to claim 1,
    wherein the steering handlebar comprises a left steering handlebar and a right steering handlebar which is separated from the left steering handlebar, each of the left and right steering handlebars being fixed to an upper end portion of the front fork, and
    wherein the protruding portion comprises a first protruding portion extending from a front side portion of the holding portion toward the center portion, and a second protruding portion extending from a rear side portion of the holding portion toward the center portion.

3. The steering system for the motorcycle according to claim 2, further comprising:
    a cover portion provided integrally with the top bridge and projecting forward from a front side portion of the top bridge so as to cover an upper portion of a main switch.

4. The steering system for the motorcycle according to claim 3,
    wherein the main switch is fixed to a lower portion of the cover portion, and
    wherein the steering system further comprises a projecting portion provided integrally with the top bridge and extending between the front side of the top bridge and a side portion of the cover portion.

5. A motorcycle comprising:

a body frame; and a steering system comprising:
- a head pipe provided at a front end portion of the body frame;
- a steering stem supported by the head pipe;
- a top bridge having a center portion, a side portion extending from the center portion, and a holding portion provided at the side portion, the top bridge being supported by the steering stem at the center portion to steerably move around the head pipe;
- a bottom bridge supported by the steering stem to steerably move around the head pipe;
- a front fork held by the top bridge through the holding porting and held by the bottom bridge, the front fork rotatably supporting a front wheel; and
- a steering handlebar provided at the side portion of the top bridge to move together with the top bridge, wherein the top bridge has a protruding portion provided on an upper face of the top bridge and extending from the holding portion toward the center portion of the top bridge.

* * * * *